United States Patent
Lee

(10) Patent No.: US 8,159,910 B2
(45) Date of Patent: Apr. 17, 2012

(54) APPARATUS AND METHOD FOR CONTROLLING TRACKING ERROR BALANCE IN OPTICAL DISC APPARATUS

(75) Inventor: Ki Yong Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 910 days.

(21) Appl. No.: 11/781,744

(22) Filed: Jul. 23, 2007

(65) Prior Publication Data
US 2008/0123488 A1    May 29, 2008

(30) Foreign Application Priority Data
Nov. 28, 2006  (KR) .................. 10-2006-0118049

(51) Int. Cl.
*G11B 15/52* (2006.01)

(52) U.S. Cl. ............ 369/47.36; 369/44.11; 369/53.26; 369/53.28

(58) Field of Classification Search .......... None
See application file for complete search history.

(56) References Cited

U.S. PATENT DOCUMENTS

| 2005/0083811 A1* | 4/2005 | Halloush et al. | 369/47.51 |
| 2006/0002248 A1* | 1/2006 | Kim et al. | 369/44.27 |
| 2006/0171265 A1* | 8/2006 | Fukui | 369/44.28 |
| 2007/0053265 A1* | 3/2007 | Naoi et al. | 369/47.53 |
| 2007/0104062 A1* | 5/2007 | Irioka et al. | 369/53.11 |

FOREIGN PATENT DOCUMENTS

| CN | 101213599 A | 7/2008 |
| JP | 2001-52339 A | 2/2001 |
| KR | 10-2005-0033243 A | 4/2005 |
| WO | WO-2007/004117 A1 | 1/2007 |

* cited by examiner

*Primary Examiner* — Lixi C Simpson
(74) *Attorney, Agent, or Firm* — Birch, Stewart, Kolasch & Birch, LLP

(57) ABSTRACT

A method of controlling a tracking error balance in an optical disc apparatus, and the optical disc apparatus are discussed. In an embodiment of the present invention, when a tracking error balance for writing is controlled, a beam power that is appropriate for the writing characteristics of an optical disc is applied. The beam power can be determined based on the Manufacturer Identifier (MID) of the optical disc and writing power information for different MIDs. The beam power can be determined to be a value of 20 to 50% of the prestored writing power for the MID of the optical disc.

18 Claims, 5 Drawing Sheets

$MPP = (I_A+I_D)-(I_B+I_C)$ $SPP1 = (I_{E1}-I_{E2})$       $SPP2 = (I_{F1}-I_{F2})$ $SPP = SPP1+SPP2$ $DPP = MPP-kSPP=(I_A+I_D)-(I_B+I_C)-k\{(I_{E1}-I_{E2})+(I_{F1}-I_{F2})\}$

Focus Error $= (I_A+I_C)-(I_B+I_D)$

Write Power Value Information

|    | Manufacture ID | Write Power Value |
|----|----------------|-------------------|
| #1 | 0000 0001      | 16mW              |
| #2 | 0000 0100      | 18mW              |
| #3 | 0000 1100      | 13mW              |
| #4 | 0000 1111      | 15mW              |
| ⋮  | ⋮              | ⋮                 |

Disc

| LIA | Data Area | LOA |

Manufacture ID
(ex : 0000 1111)

APPARATUS AND METHOD FOR CONTROLLING TRACKING ERROR BALANCE IN OPTICAL DISC APPARATUS

This application claims the priority benefit of Korean Patent Application No. 10-2006-118049 filed on Nov. 28, 2006, hereby incorporated by reference as if fully set forth herein.

BACKGROUND OF THE INVENTION

1. Field of the Invention

The present invention relates to an apparatus and method for controlling a tracking error balance in an optical disc apparatus.

2. Description of the Related Art

After Compact Discs (CDs), that is, optical recording media capable of recording 74 minutes of music or about 650 Mbytes of data, have been commercialized, Digital Versatile Discs (DVDs) capable of recording a 2-hour Standard Definition (SD)-class movie were widely commercialized, and Blu-ray Discs (BDs) and High-Density Digital Versatile Discs (HD-DVDs) capable of recording a High Definition (HD)-class movie will appear on the market in the near future.

Optical recording media, such as CDs, DVDs and BDs, are disc-shaped media for recording data using optical characteristics, and data can be written on the discs and read from the discs using optical pickups. Optical recording media include discs for playing on which data is written already, and discs for recording, such as CD-R/RW, DVD-R/+R/-RW/+RW/RAM and BD-R/-RE media, that can be written or rewritten.

An optical pickup writes data on a disc or reads data from a disc in the state in which a laser beam is correctly focused on the track of the disc, which is rotating at high speed.

Such an optical pickup is provided with optical components such as an objective lens and a beam splitter, instrumental components such as an actuator and a base, and electrical components such as a Laser Diode (LD) and a photo detector, so that servo signals such as a focusing error signal and a tracking error signal, corresponding to the position error of an optical spot formed on a disc, can be obtained and the position error of the optical spot can be corrected based on the servo signals. As such, a servo operation can be performed.

In the detection of a focusing error signal, an astigmatism method is generally used regardless of the type of disc and the purpose of the disc, such as writing and playing. In the detection of the tracking error signal, a 3-beam method and a Differential Phase Detection (DPD) method are generally used for discs for playing, and a Differential Push-Pull (DPP) method is typically used for discs for writing.

FIG. 1 is a view illustrating the principle by which a tracking error signal is detected using the DPP method according to a related art.

The DPP method is an improvement on the related art 1-beam push-pull method. This method is one capable of removing offset occurring due to the movement of the objective lens in a radial direction, or due to the tilt of a disc, and detecting a stable tracking error signal.

In the DPP method as shown in FIG. 1, when a laser beam output from a light source via a diffraction element, called a "grating," is separated into 0-order and +/−1-order diffracted light and a main beam (that is, the 0-order diffracted light) is radiated on the groove of the track of a disc, the grating is controlled such that sub beams (that is, the +/−1-order diffracted light) are radiated on a land adjacent to the groove where the main beam is located. That is, the sub beams are spaced apart a ½ track pitch from the main beam. At racking error signal is detected based on a difference signal between the right and left of each beam on the basis of the radial direction.

The main beam reflected from the disc is received by a main photo detector segmented into four (a, b, c and d), and is detected as a Main Push-Pull (MPP) ((A+D)−(B+C)) signal, that is, a push-pull signal. Each sub beam reflected from the disc is received by a sub photo detector that is segmented into two (E1, E2) or (F1, F2), and is detected as a Sub Push-Pull (SPP) ((E1−E2)+(F1−F2)) signal. When the main beam and the sub beam are spaced apart a ½ track pitch from each other, the MPP and SPP signals have opposite phases.

Both the MPP and SPP signals experience offset in the same direction due to a tilt or movement of the objective lens in the radial direction. Accordingly, a push-pull signal from which the offset has been removed can be obtained through calculation based on DPP=MPP−k×SPP where k is a proportional constant.

Improved playing and writing performance can be obtained only when amplitude, offset and balance are accurately controlled for servo signals, such as a focusing error signal and a tracking error signal. The balance control of the servo signals, particularly the balance control of the tracking error signal, causes the beam spot to accurately follow the center of a track by making upper and lower amplitudes similar, as illustrated in FIG. 2.

In the DPP method, the control of tracking error balance is adapted to control the gain for the MPP signal so that (A+D) and (B+C) having the same signal level are output, and to control the gain for the SPP signal so that the signal levels of (E1+F1) and (E2+F2) are also the same.

When an optical disc is played, an operation of controlling tracking error balance is generally performed and a controlled value is generally used unchanged in both recording and playing operations. However, if tracking error balance controlled for a playing operation is applied unchanged to recording operations, the writing quality is affected to some degree due to the difference in the optical output at the time of playing from and writing to the disk. Therefore, it is advantageous if the optical output is performed in conditions similar to the writing conditions, in particular, in conditions where the optical output is similar to the output power (10 to 20 mW). In other words, in order to improve the writing quality, the tracking error balance can be controlled under conditions similar to those of the writing operation, that is, in a state in which the output power of the LD is increased to about 2 mW (the output power for playing is usually about 1 mW).

If the tracking error balance for writing is not normally controlled under the above conditions, the tracking error balance control operation is performed while the output power of the LD is gradually increased, for example, the output power value of the LD is gradually increased from 2 mW to 5 mW.

However, if the tracking error balance is controlled while the output power is increased as described above, data can actually be recorded on the optical disc, thus resulting in the damaged disc, which is a problem.

SUMMARY OF THE INVENTION

Accordingly, the present invention has been made keeping in mind the above problems and limitations associated with the related art, and an object of the present invention is to provide a method of controlling a tracking error balance while applying optical power that is appropriate for the media characteristics of an optical disc.

In order to accomplish the above other objects, the present invention provides according to an embodiment a method of controlling a tracking error balance in an optical disc apparatus, including the steps of determining beam power appropriate for writing characteristics of an optical disc; and controlling a tracking error balance using the determined beam power.

In addition, the present invention provides according to an embodiment an optical disc apparatus, including an optical drive unit for writing data on a disc or playing data from a disc, using a laser beam; a servo unit for performing a servo operation for writing or playing; a storage unit for managing writing power information for respective optical disc manufacturers; and a controller for determining beam power suitable for writing characteristics of an optical disc and controlling the optical drive unit and the servo unit so as to control a tracking error balance using the determined beam power.

In an embodiment of the present invention, the beam power may be determined based on the Manufacturer IDentifier (MID) of the optical disc and writing power information for each MID. For example, the beam power may be determined to be a value of 20 to 50% of writing power value for the MID of the optical disc. If no data for the MID of the optical disc exists in the writing power value information, the beam power may be determined to be a default value and the default value may be 20 to 50% of the lowest writing power value of the writing power value information.

In an embodiment of the present invention, the MID may be checked from the optical disc when an initial operation for the optical disc is performed or when writing on the optical disc is requested. When the MID is checked at a time that the initial operation is performed, the MID is temporarily stored in the memory of the optical disc apparatus.

In an embodiment of the present invention, the writing power information for each MID can result from experiments and is stored in the memory of the optical disc apparatus. For instance, the writing power information for each MID is stored in the memory of the optical disc apparatus when the optical disc apparatus is manufactured or when the optical disc apparatus is updated.

According to another aspect, the present invention provides an optical disc apparatus comprising: a storage unit to store writing power information for a plurality of different disk manufacturers; and a controller to obtain a writing power value pre-assigned for a manufacturer of an inserted optical disk from the stored writing power information, to determine a writing power value for the inserted optical disc based on the obtained writing power value, and to control a tracking error balance of the inserted optical disc using the determined writing power value.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Preferred embodiments of an apparatus and method for controlling a tracking error balance in an optical disc apparatus according to the present invention will be described in detail with reference to the accompanying drawings.

According to an embodiment of the present invention, a disc or recording medium for recording includes a Manufacturer Identifier (MID) in a lead-in region. Information about power suitable for writing for each disc manufacturer is managed in an optical disc apparatus. MID is information that is unique to a disc manufacturer and can be used to identify the medium or writing characteristics of a disc. If the MID is known, appropriate writing power for a disc can be known, and a power value corresponding to the degree to which data is not recorded on the disc can also be calculated.

Therefore, in the present invention, in order to prevent data from being erroneously recorded on a disc in the process of controlling a tracking error balance for writing, the tracking error balance for writing is controlled using the output power of an LD, which is controlled based on the writing characteristics of the disc.

The writing characteristics of a disc can be checked from the MID of a disc, which has been recorded on the disc, and/or from manufacturer-based writing power value information, which is managed in an optical disc apparatus.

Figure 1:
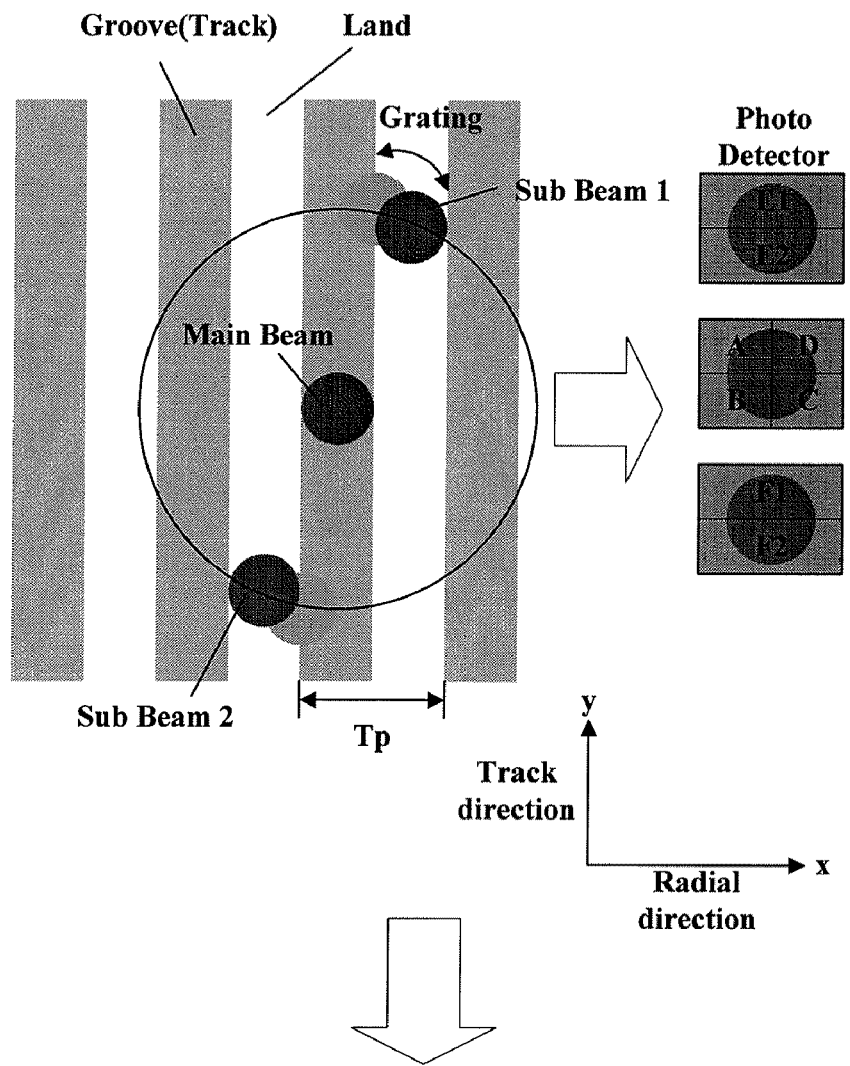
FIG. 1 is a view illustrating the principle by which a tracking error signal is detected using a DPP method.
Figure 2:
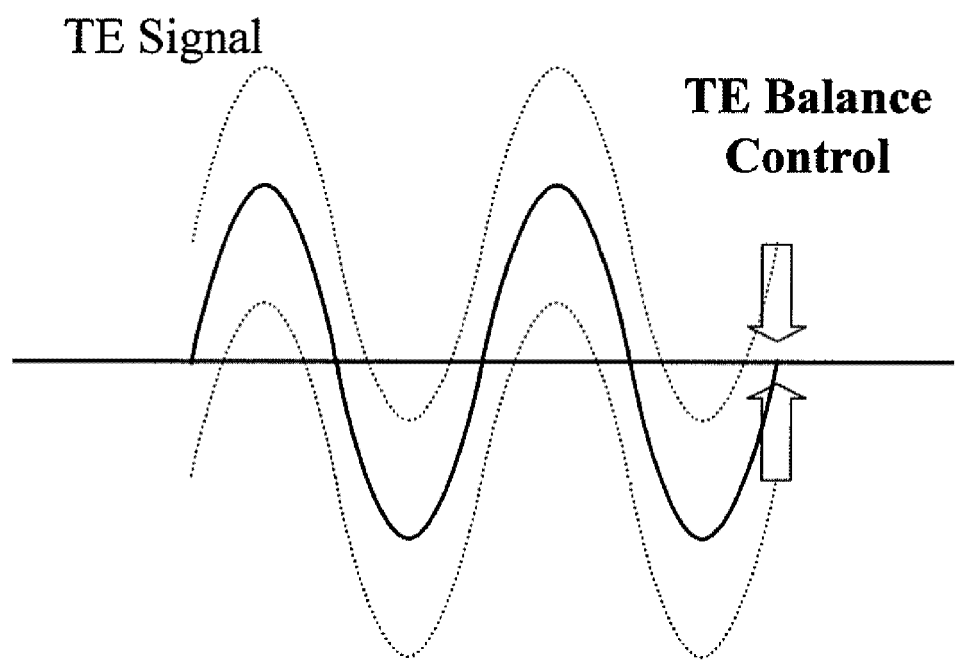
FIG. 2 is a view illustrating a general operation of controlling a tracking error balance.
Figure 3:
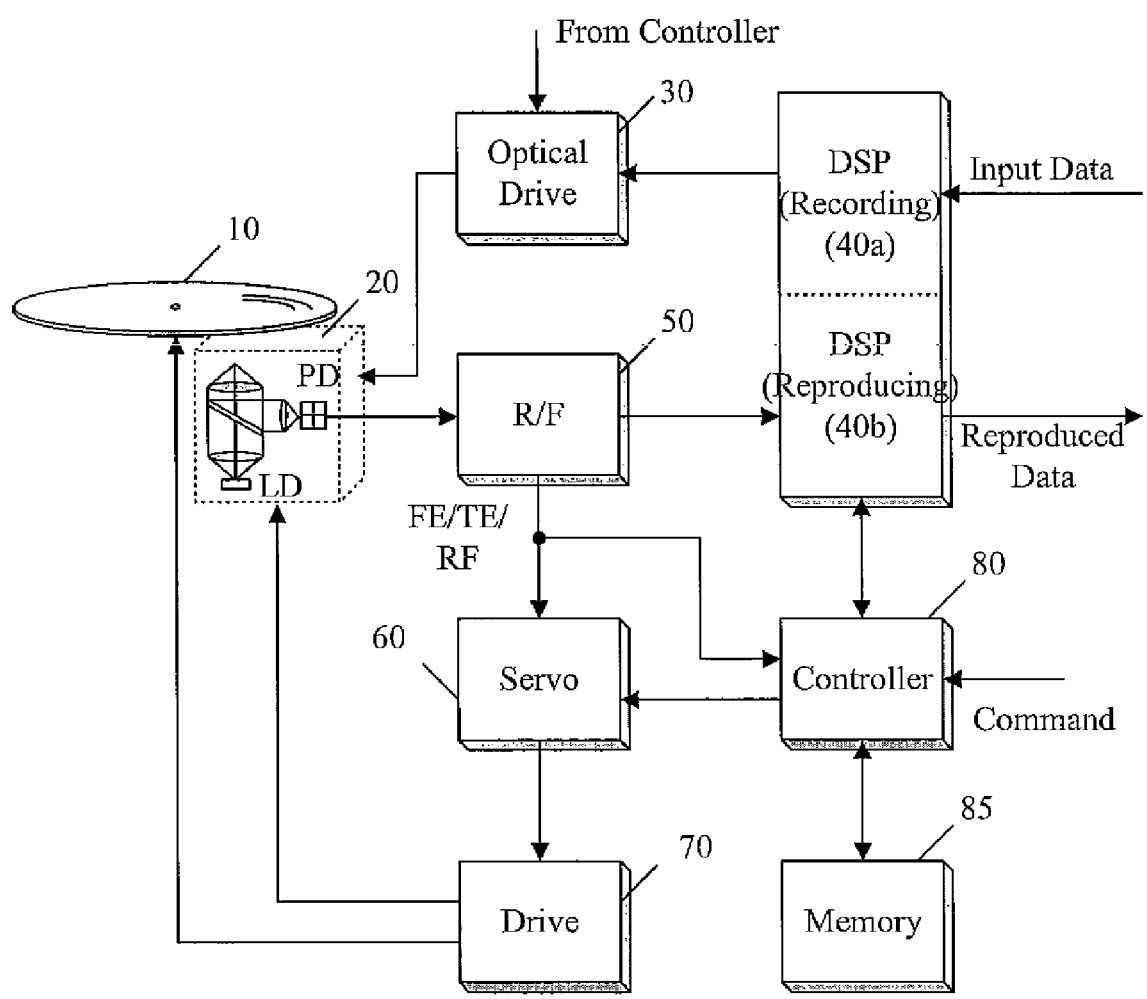
FIG. 3 is a block diagram showing the construction of an optical disc apparatus to which the present invention is applied.

FIG. 3 is a block diagram showing the construction of an optical disc apparatus to which the present invention is applied. An optical disc apparatus, such as a DVD recorder/player or other disc recorder/player, may include an optical pickup 20, an Optical Drive (OD) 30, a Digital Signal Processor (DSP) 40 (40a, 40b), a Radio Frequency (RF) unit 50, a servo unit 60, a drive unit 70, a controller 80, and memory 85. All components of the optical disc apparatus are operatively coupled and configured.

Figures 4, 5:
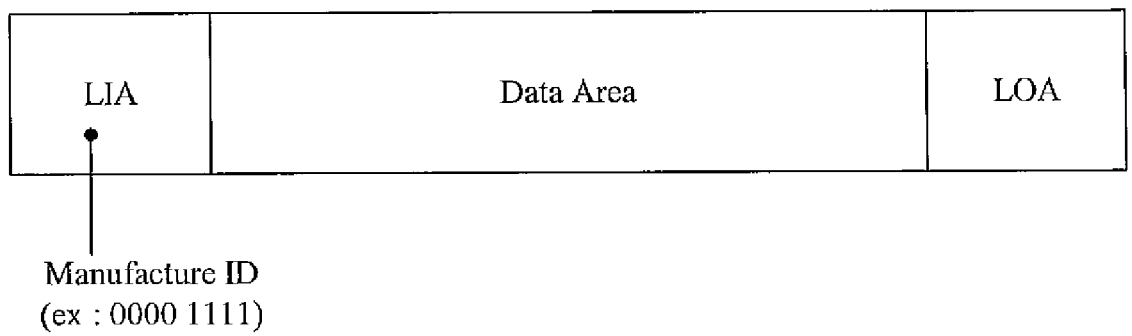
FIG. 4 is an example of a table in which writing power value information is managed for respective manufacturer identifiers according to an embodiment of the present invention.
FIG. 5 is a view illustrating an example in which a manufacture identifier is included in a lead-in region of an optical disc according to an embodiment of the present invention.

Non-volatile memory, such as Electrically Erasable Programmable Read-Only Memory (EEPROM) or flash memory, can be used as the memory 85. As illustrated in FIG. 4, the memory 85 manages information about writing power values for respective manufacturers. Preferably, the writing power value information is obtained based the results of experiments on writing on the discs of respective manufacturers. When an optical disc apparatus is manufactured, or when an optical disc apparatus is updated (e.g., the firmware of the optical disc apparatus is updated), the writing power value information can be stored in the memory 85.

An MID, recorded preferably in the lead-in region of an optical disc (or recording medium), as illustrated in FIG. 5, may be checked when the optical disc is inserted or when the optical disc apparatus starts again, e.g., at the time that an initial operation is performed on the optical disc, and may be temporarily stored in the memory 85. Alternatively, an MID may be checked when a tracking error balance operation for writing is performed.

The controller 80 searches the writing power value information, stored in the memory 85, for a writing power value associated with the MID checked in the initial operation, and performs a tracking error balance operation for writing using a writing power value that is lower than the found writing power value. This will be described in detail below.

Figure 6:
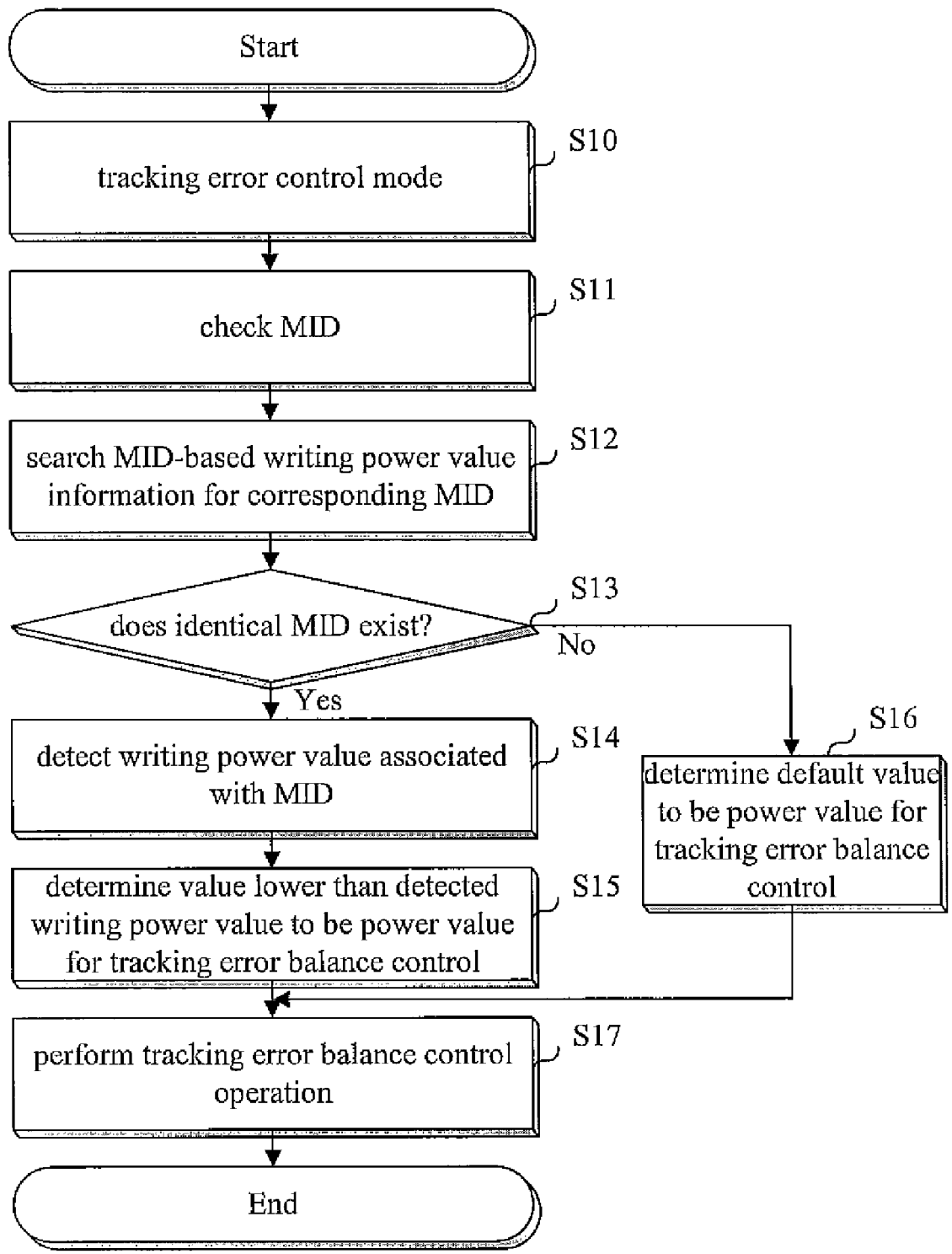
FIG. 6 is a flowchart illustrating a method of controlling a tracking error balance in the optical disc apparatus according to an embodiment of the present invention.

FIG. 6 is a flowchart illustrating a method of controlling a tracking error balance in an optical disc apparatus according to an embodiment of the present invention. This method is implemented in the optical disc apparatus of FIG. 3 or in another suitable optical disc device.

Referring to FIG. 6, if a writing operation for the optical disc 10 in the optical disc apparatus is requested, the controller 80 performs a servo control operation. If a tracking error balance control mode is entered during the servo control operation at step S10, the MID recorded in the lead-in region of the optical disc 10 is obtained at step S11. The MID may have already been checked at the time of the initial operation of the optical disc 10, e.g., when the optical disc is inserted or the optical disc apparatus starts again, and may have been temporarily stored in the memory 85.

The controller 80 searches the MID-based writing power value information, managed or stored in the memory 85, for the obtained MID at step S12. For example, if it is determined that the MID recorded in the lead-in region of the optical disc 10 is "0000 1111" and an MID identical to "0000 1111" exists within the MID-based writing power value information stored in the memory 85 at step S13, the controller 80 obtains a writing power value associated with the MID "0000 1111", e.g., from the table as shown in FIG. 4 at step S14.

The controller 80 then determines a value lower than the obtained writing power value, for example, 20 to 50% of the obtained writing power value, to be a power value appropriate for the tracking error balance control of the optical disc 10 at step S15. In the example of FIG. 4, the obtained writing power value corresponding to the MID "0000 1111" is "15 mW," and the controller 80 selects a power value of 3.75 mW, that is, 25% of the obtained power value of 15 mW, to be applied to the tracking error balance control operation for the disc 10.

In contrast, if there is no MID information identical to the MID of the disc 10 in the MID-based writing power value information managed in the memory 85 at step S13, the controller 80 determines a default power value for the tracking error balance control based on the writing power value information at step S16. For instance, the default value may be 20 to 50% of the lowest value of the writing power value managed in the memory 85, for example, 25% thereof.

The controller 80 then controls the optical drive unit 30 and the servo unit 60 so as to perform the tracking error balance control operation based on the calculated or determined power value (e.g., 25%×15 mW=3.75 mW) or the default value at step S17. Thus, the tracking error balance control operation for writing may be performed based on a power value that is suitable for the media characteristics of the optical disc 10.

As a result, writing quality can be improved by appropriately controlling the tracking error balance, and data can be prevented from being erroneously written on an optical disc in the operation of controlling the tracking error balance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a tracking error balance in an optical disc apparatus, comprising:
   determining a beam power appropriate for writing characteristics of an optical disc, wherein the beam power appropriate is determined to be a value lower than a writing power value pre-assigned for a manufacturer of the optical disc irrespective of a temperature of a laser diode; and
   controlling a tracking error balance using the determined beam power.

2. The method as set forth in claim 1, wherein the beam power is determined based on a Manufacturer IDentifier (MID) of the optical disc and writing power information for each MID.

3. The method as set forth in claim 2, wherein the beam power is determined to be a value of approximately 20 to 50% of a writing power value assigned for the MID of the optical disc.

4. The method as set forth in claim 2, wherein, if no data for the MID of the optical disc exists in the writing power information, the beam power is determined to be a default value.

5. The method as set forth in claim 4, wherein the default value is a value of approximately 20 to 50% of a lowest writing power value in the writing power information.

6. The method as set forth in claim 2, further comprising:
   checking the MID from the optical disc when an initial operation for the optical disc is performed or when writing on the optical disc is requested.

7. The method as set forth in claim 6, wherein, when the MID is checked at a time that the initial operation is performed, the MID is temporarily stored in a memory of the optical disc apparatus.

8. The method as set forth in claim 2, further comprising:
   storing the writing power information for each MID in a memory of the optical disc apparatus.

9. The method as set forth in claim 8, wherein the writing power information for each MID is stored in the memory of the optical disc apparatus when the optical disc apparatus is manufactured or when the optical disc apparatus is updated.

10. The method as set forth in claim 1, further comprising:
    storing, in a storage unit of the optical disc apparatus, a list of writing power values pre-assigned respectively for a plurality of different disc manufacturers.

11. An optical disc apparatus, comprising:
    an optical drive unit to write data on an optical disc or playing data from the optical disc, using a laser beam;
    a servo unit to perform a servo operation for writing or playing to or from the optical disc;
    a storage unit to manage writing power information for respective optical disc manufacturers; and
    a controller to determine a beam power suitable for writing characteristics of the optical disc and to control the optical drive unit and the servo unit so as to control a tracking error balance for the optical disc using the determined beam power, wherein the controller determines the beam power suitable to be a value lower than a writing power value pre-assigned for a manufacturer of the optical disc irrespective of a temperature of a laser diode.

12. The optical disc apparatus as set forth in claim 11, wherein the controller determines the suitable beam power based on a manufacturer identifier (MID) of the optical disc, and the writing power information, which is managed in the storage unit.

13. The optical disc apparatus as set forth in claim 12, wherein the controller searches the storage unit for a writing power value based on the MID of the optical disc, and determines the suitable beam power to be a value of approximately 20 to 50% of a found writing power.

14. The optical disc apparatus as set forth in claim 12, wherein if no data for the MID of the optical disc exists in the writing power information, the controller determines the suitable beam power to be a value of approximately 20 to 50% of a lowest writing power value in the writing power information.

15. The optical disc apparatus as set forth in claim 12, wherein the controller checks the MID from the optical disc when an initial operation on the optical disc is performed or when writing on the optical disc is requested.

16. The optical disc apparatus as set forth in claim 15, wherein if the MID is checked when the initial operation on the optical disc is performed, the controller temporarily stores the MID of the optical disc in the storage unit.

17. The optical disc apparatus as set forth in claim 15, wherein the writing power information is stored in the storage unit when the optical disc apparatus is manufactured or when the optical disc apparatus is updated.

18. An optical disc apparatus comprising:
 a storage unit to store writing power information for a plurality of different disc manufacturers; and
 a controller to obtain a writing power value pre-assigned for a manufacturer of an inserted optical disc from the stored writing power information, to determine a writing power value for the inserted optical disc based on the obtained writing power value, and to control a tracking error balance of the inserted optical disc using the determined writing power value, wherein the determined writing power value is determined to be a value lower than the writing power value pre-assigned for the manufacturer of the inserted optical disc irrespective of a temperature of a laser diode.

* * * * *